United States Patent [19]
Huveteau

[11] Patent Number: 4,735,225
[45] Date of Patent: Apr. 5, 1988

[54] METHOD AND APPARATUS FOR DRAWING AND REGULATING THE OUTPUT AND PRESSURE OF A LIQUID ADDITIVE

[75] Inventor: Jean L. Huveteau, Fressenneville, France

[73] Assignee: Robinetterie S.F.R. S.A., Paris, France

[21] Appl. No.: 897,828

[22] Filed: Aug. 19, 1986

[30] Foreign Application Priority Data

Aug. 19, 1985 [FR] France ................................ 85 12736

[51] Int. Cl.⁴ ............................................. G05D 11/13
[52] U.S. Cl. ............................................. 137/8; 73/3; 137/240; 137/486; 137/487.5; 137/569; 137/606
[58] Field of Search ................ 137/606, 569, 8, 605, 137/486, 9, 487.5, 240, 597, 607; 417/413, 440; 73/3, 168, 198

[56] References Cited

U.S. PATENT DOCUMENTS

| | | | |
|---|---|---|---|
| 2,065,466 | 12/1936 | Horn | 137/606 X |
| 2,826,067 | 3/1958 | Braunlich | 73/168 |
| 3,464,626 | 9/1969 | Stamps et al. | 239/10 |
| 3,543,784 | 12/1970 | Smith | 137/8 X |
| 3,637,137 | 1/1972 | Bok | 137/240 X |
| 3,770,198 | 11/1973 | Miharu | |
| 3,939,688 | 2/1976 | Misch et al. | 73/3 |
| 4,119,406 | 10/1978 | Clemens | 137/597 X |
| 4,143,998 | 3/1979 | O'Connor | 417/413 |
| 4,324,294 | 4/1982 | McLoughlin | 137/101.21 X |
| 4,341,107 | 7/1982 | Blair et al. | 73/3 |
| 4,392,514 | 7/1983 | Farley et al. | 137/607 X |
| 4,497,334 | 2/1985 | Wolf et al. | 137/240 X |

FOREIGN PATENT DOCUMENTS

| | | | |
|---|---|---|---|
| 2940442 | 4/1981 | Fed. Rep. of Germany | 137/569 |
| 2321235 | 3/1977 | France | |
| 2321335 | 3/1977 | France | |

OTHER PUBLICATIONS

TR M. R. Gebhardt, A. R. Kliethermes, C. E. Goering Title: Metering Concentrated Pesticides; consisting of six pages.

*Primary Examiner*—Martin P. Schwadron
*Assistant Examiner*—Stephen M. Hepperle
*Attorney, Agent, or Firm*—Kerkam, Stowell, Kondracki & Clarke

[57] ABSTRACT

The invention provides a method and an apparatus for drawing a liquid from a reservoir and regulating the output and pressure of the liquid in order to inject it in precise proportions into another liquid flowing in a distribution system with a predetermined pressure and output. A pump is disposed in a principal circuit which connects the reservoir to the distribution system. An intake of the pump is connected to the reservoir and an outlet of the pump is connected via an electrically controlled valve to the system. Prior to injecting liquid additive into the system, the output and pressure of the principal circuit may be preset by isolating the reservoir from the pump intake and connecting the pump intake to an auxiliary circuit having a water inlet controlled by a valve. After presetting, the pump intake may be connected to the reservoir to draw liquid additive therefrom and inject the liquid additive into the system. During injection, the output of the liquid additive is regulated and the pressure in the principal circuit is monitored so as to maintain the preset output and pressure. The invention is particularly applicable to agricultural equipment used for injecting additives into water flowing in a mechanized sprinkling and irrigation system.

16 Claims, 1 Drawing Sheet

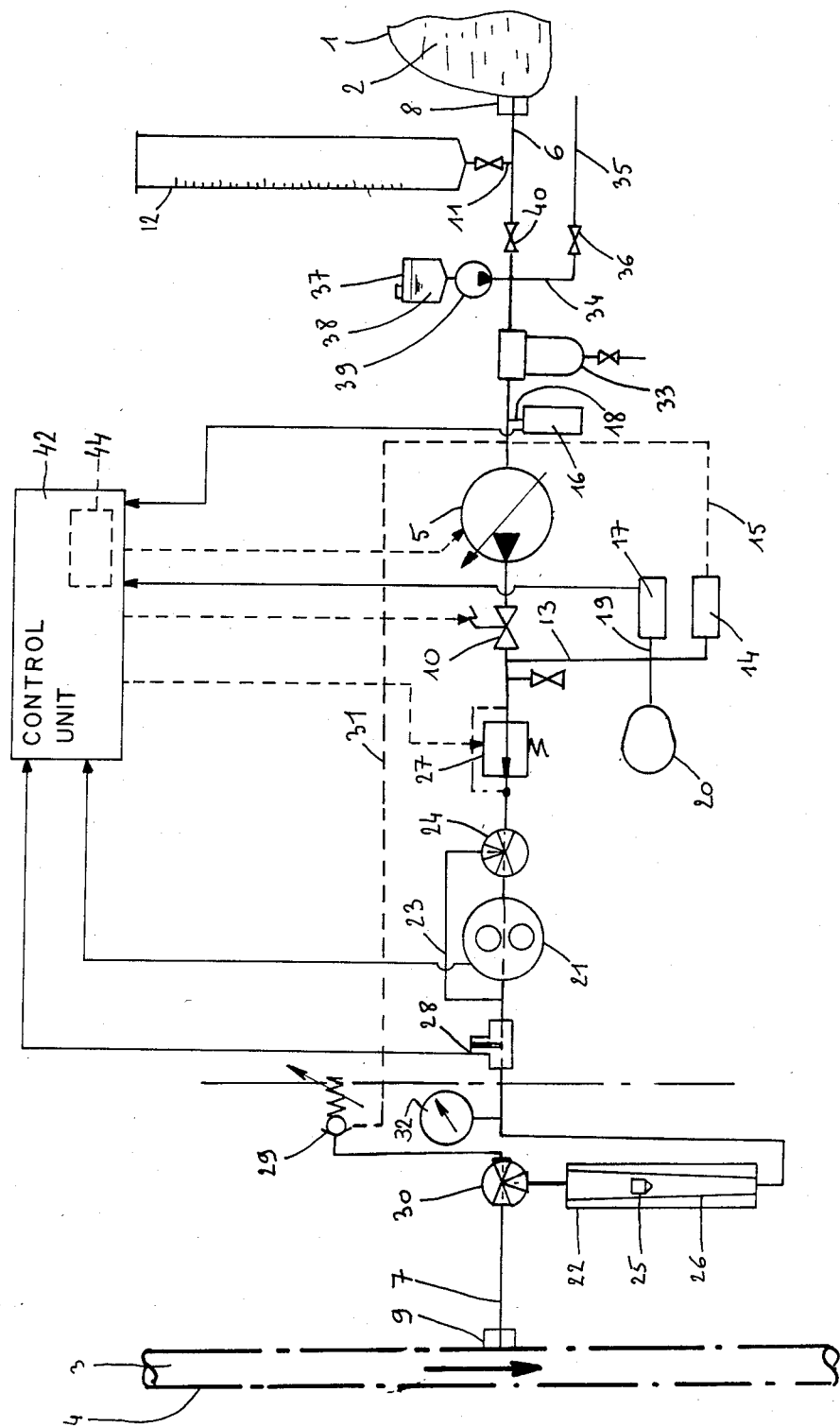

METHOD AND APPARATUS FOR DRAWING AND REGULATING THE OUTPUT AND PRESSURE OF A LIQUID ADDITIVE

The invention relates to a method and an apparatus for drawing and regulating the output and pressure of a liquid additive, with a view to injecting it in precise proportions into another liquid, which flows at a known, or controlled, pressure and output.

More particularly, but not exclusively, the invention relates to an apparatus for injecting an additive into the water in a distribution system, such as a mechanized sprinkling and aspersion irrigation system.

Irrigation by aspersion, or sprinkling, has undergone great development, and the most highly esteemed system appears to be one in which what is known as the pivot technique is applied (U.S. Pat. No. 4,337,786).

These systems, which were initially conceived of so as to supply only just the necessary amount of water to crops, include means enabling relatively precise regulation of the pressure and the output.

Nevertheless, they remain quite expensive, so those who use them would like to use them more often than for simple sprinkling, for example with a view to drawing a liquid additive from a reservoir and injecting it into the water distributed by such systems (U.S. Pat. Nos. 4,337,786 and 3,464,626).

At first, the additives comprised relatively inexpensive nutritional supplements that did not represent any danger to the environment and/or to the crops.

Accordingly, precise dosage was not necessary, and despite their simplicity the first known systems (U.S. Pat. No. 4,337,786) were adequate.

More recently, users have applied phytoprotective products, such as herbicides, insecticides and fungicides, in this manner.

Now unless the dosage is very precise and leakage is prevented, these products are for the most part very dangerous to the environment and/or to crops.

Simple systems, such as that for intermittent injection (U.S. Pat. No. 4,337,786), are accordingly unsuitable.

Given these conditions, systems have appeared which are provided not only with their additive reservoir and their pump but also with means for dosage control and safety means in the event the distribution system should become disconnected (Southeast Farm Press, May 15, 1985).

The system is moved by a carriage, to facilitate shifting from one injection point to another.

In this system, an extension of the suction tube of a roller pump dips into the reservoir to draw up the additional product there.

Between the reservoir and the pump, a bypass is provided, which is connected to a polypropylene calibration tube graduated in milliliters. This makes it possible to monitor the actual output of the pump for a brief instant as a function of the fluidity of the additive, so that the preset output can be modified if necessary, by varying the speed of rotation, so that the dosage will be satisfactory as a function of the output of the irrigation system.

The delivery pipe of the pump is provided with a device for fast coupling and uncoupling, to connect it to the irrigation system. To prevent leakage of the additive after uncoupling, the delivery pipe has an electromagnetic valve that is normally closed when its coil is not excited. To enable it to be opened, the coil is connected to a low-voltage power supply via a circuit that is divided into two sections, one of them carried by the pipe and the other by the irrigation systems and the two sections being connected to one another via taps that engage and disengage at the same time as the pipe is coupled to or uncoupled from the system, so as to function as a coupling and uncoupling detector. When the electromagnetic valve closes, the same detector directs the closure of the system.

Similar means are provided between the reservoir and the suction pipe of the pump. A panel displays the status of these detectors.

Although this system does offer greater safety, the control of output only during presetting and the control of leakage only at the points of connection with the reservoir and the cistern do not make it possible to avoid all the risks of harming the environment and the crops. In fact, between presettings the mean output of the pump may fluctuate and result in an error in dosage, and similarly a leak may occur at some other point and cause pollution. Even though the mean output is considered to be stable, the instantaneous output varies under the influence of pump-caused pulsations.

Moreover, during the presetting operations performed with the additive, the additive continues to be delivered at an indeterminate dosage to the water in the system.

An object the invention seeks to attain is a method and apparatus that provide a maximum of safety and in particular guarantee that injection proceeds correctly, that the pipes or tubes do not leak, that siphoning of the chemical products in the event of defective check valves in the irrigation circuit is impossible, and that an error in dosage cannot occur.

Another object of the invention is a method and apparatus with which verification of the dosages applied is easy and does not create any harm.

To attain this object, the subject of the invention is a method of the above-described type, more particularly characterized in that the output of the additive is regulated;
the pressure in the principal circuit 6, 7 is monitored;
the pulsations of the dosing pump 5 are damped.

The subject of the invention is also an apparatus for performing the above method.

The invention will be better understood from the ensuing description given by way of non-limiting example, taken in conjunction with the accompanying drawing, which briefly described shows the preferred version of the apparatus in schematic form.

Turning now to the drawing, it will be seen that the apparatus is associated with a reservoir 1 containing the additive 2 which is to be injected into the water 3, which flows with a controlled or perfectly well known pressure and output into a pipeline of a distribution system 4.

The apparatus also includes a dosing pump 5, interposed in a principal circuit comprising an upstream section and a downstream section connecting the reservoir 1 and the system 4. The upstream section 6, which forms the suction intake pipe of the pump, is connected to the reservoir 1, while the downstream section 7, which forms the outlet delivery pipe of the pump, is connected to the system 4.

To make these connections, connecting means 8 and 9 are provided, which may be of any type, for example similar to those with which the presently known systems described above are equipped.

Interposed in the circuit 6, 7 is at least one electrically controlled valve 10, preferably a valve that closes in the absence of electric current, to prevent siphoning of the apparatus.

Also in a known manner, one end of a delivery pipe 11 may be connected to the suction pipe 6, its other end being connected to a calibration tube 12 that is suitably graduated so that it can act as a flow meter during the time required for emptying it.

Downstream of the pump 5 in a bypass 13, the circuit is seen to include a safety valve 14 protecting against accidental overpressure and being for example regulated at 10 bar. Naturally the leakage output 15 of this value is returned to the reservoir 1 or to an auxiliary reservoir or to the circuit upstream of the pump 5.

At least one pressure-drop detector 16 or 17 is connected to the circuit 6, 7 via a corresponding bypass 18 or 19; preferably, two detectors are provided, one, 16, for detecting a pressure drop in the upstream section 6, for example detecting a vacuum, and the other, 17, for detecting a pressure drop in the downstream section 7 of the circuit and tripping at a pressure of at most 1.5 bar, for example, so that by way of at least relative low pressure, it will detect any sign of leakage and immediately stop and isolate the apparatus and the system.

To prevent the pump from causing errors in dosage after an intermittent injection, a pulsation damper 20 is connected to the bypass 13 downstream of this pump.

In addition to the flow meter 12, which may comprise the graduated tube if one is provided and which given its limited volume cannot be utilized except intermittently, the circuit section 7 has at least one flow meter 21 or 22 downstream of the pump 5 and, if there is a pulsation damper 20, this flow meter is known as a continuous flow meter, because it is selected as a type capable of controlling output during the entire period that the system is in operation. Preferably two flow meters 21, 22 are employed. The continuous flow meter may be electronic 21 or non-electronic 22.

The electronic flow meter 21 is a volumetric flow meter, by way of example.

For disassembly purposes, for instance, it may be short-circuited by a bypass 23 under the control of a distribution device 24, such as a three-way valve.

The other flow meter 22 is, for example, a Cartesian diver flow meter 25 housed in a frustoconical chamber 26 in such a manner that if the output drops, it descends to the short base of the flow meter chamber, and inversely, if the output is elevated, it rises in proportion to this output toward the long base of this chamber 26, thus enabling rapid evaluation of the output.

The circuit advantageously also includes at least one regulator, such as a regulatable stopper 27.

In a preferred embodiment, it also includes an electronic transducer 28, which in the case where the output varies more or less within predetermined limits with respect to the desired output controls one of the means, via an electric control unit or switch box 42, to correct the output or stop it if the limits have been exceeded; the means controlled are, first, the pump 5 and, second, one of the flow devices such as the electric valve 10 and the stopper 27.

To perform presetting without risk of pulluting the water in the system 4, a pressure simulation valve 29 and a distribution valve 30 may be provided downstream of the circuit. The valve 30 may be a three-way valve that disconnects the system from the circuit and there substitutes the pressure simulation valve 29, the leakage output 31 of which is returned to the reservoir 1, or to an auxiliary reservoir, or back to the circuit but upstream of the pump.

To be able to monitor pressure, a manometer 32 is connected to the circuit, preferably upstream of this distribution device 30, to enable monitoring the pressure no matter what route the product takes past this device 30.

Other means will also be described hereinafter for attaining this same object of presetting without the risk of pollution.

To prevent the circuit devices from becoming functionally impaired by impurities, a filter 33 and/or an auxiliary circuit 34, connected to the principal circuit, are provided in the circuit upstream of the above-mentioned devices, the circuit 34 preferably being connected upstream of the filter 33 and enabling cleaning to be done.

This auxiliary circuit includes a water inlet 35 controlled by a valve 36. It also includes a detergent reservoir 38 having an auxiliary pump 39 for injecting this detergent into the water used for cleaning.

The mixture of cleaning water and detergent product is then aspirated into the main pump and passes through all the devices. During this operation, the circuit is naturally isolated from the reservoir 1 by a valve 40 and from the system by the device 30.

Then, without adding detergent via the auxiliary circuit, rinsing water is injected.

Because of this cleaning circuit, it is possible to send water into the circuit without adding detergent.

This water can then be injected into the distribution pipe 4 while monitoring the output, which makes it possible to adjust the output by injecting some harmless product. In doing so, the auxiliary circuit and its devices comprise the preferred means for presetting the output.

The main pump 5, comprising a dosing pump, is preferably a diaphragm pump controlled directly or indirectly by at least one electromagnet or servo motor, which by varying the power supply to this electromagnet or servo motor enables a modification of the pump output and hence enables very precise regulation of this output.

The control unit 42, includes memories and programmable means 44 that manage all the functions, encompassing all the automatic control functions in the form of controlling the apparatus as a function of the work required, such as irrigation, fertilization or treatment. Naturally it may be provided with a control means, even a remote control means.

The apparatus naturally has other applications as well, such as dispensing doses of tonics or medicines into animals' drinking water.

The reservoir may be integrated with the apparatus, and for example may be mounted with it on a carriage (not shown).

With this element, the procedure is as follows:
the output in the principal circuit 6, 7 is preset without injecting additive 2 into the pipe, and then during the injection of the additive 2;
the output of the additive 2 is regulated;
the pressure in the principal circuit 6, 7 is monitored;
the pulsations of the dosing pump 5 are damped.

To perform regulation, the reservoir 1 for the additive is isolated from the principal circuit 6, 7 and a water inlet 35 is connected there.

In a variant embodiment, to perform presetting, the principal circuit 6, 7 is isolated from the pipe 4, and the principal circuit 6, 7 is connected to a simulation valve 29.

What is claimed is:

1. A method of drawing a liquid additive from a reservoir and regulating the output and pressure of the liquid additive in order to inject the liquid additive in precise proportions into another liquid flowing in a distribution system with a predetermined pressure and output by using apparatus that includes, disposed in a principal circuit, a pump having an intake connected to the liquid additive reservoir and an outlet connected to the system through an electrically controlled valve, and a safety valve protecting against accidental over pressure, the method comprising presetting the output and pressure of the principal circuit without injecting liquid additive into the system by isolating the reservoir from the pump intake and supplying water to the pump intake; thereafter injecting liquid additive into the system by supplying liquid additive to the pump intake; and, during said injection, controlling the apparatus to provide a preset output and pressure of the liquid additive, said controlling comprising regulating the output of the liquid additive, monitoring the pressure in the principal circuit, and damping pulsations of the pump.

2. The method of claim 1, wherein said controlling comprises controlling the pump and the electrically controlled valve.

3. A method according to claim 1, wherein the presetting comprises isolating the principal circuit from the system, and connecting the principal circuit to a simulation valve.

4. An apparatus for drawing a liquid additive from a reservoir and regulating the output and pressure of the liquid additive to inject the liquid additive in precise proportions into another liquid flowing in a distribution system with a predetermined pressure and output, the apparatus comprising a pump having an intake and an outlet disposed in a principal circuit, means for connecting the intake to the reservoir and the outlet to the system, the connecting means including an electrically controlled valve disposed in the principal circuit downstream from the pump, and a safety valve downstream of the pump for protecting against accidental excess pressure; means for presetting the output of the principal circuit without injecting liquid additive into the system, said presetting means comprising means for isolating the pump intake from the reservoir, and means for supplying to the pump intake water from an auxiliary circuit which includes a water inlet controlled by a valve; and means for controlling the pump and the electrically controlled valve to provide a preset output of liquid additive to the system, the controlling means including means for monitoring the pressure in the principal circuit, and means for damping pulsations of the pump.

5. An apparatus according to claim 4, wherein the means for presetting without injecting additive into the system include, downstream of the principal circuit further includes a pressure simulation valve and a three-way valve which disconnects the system from the principal circuit and substitutes therefor the pressure simulation valve.

6. An apparatus according to claim 5, wherein the pump has an output which may be controlled by an electrical signal.

7. An apparatus according to claim 5, wherein the controlling means comprises a control unit having memory and programmable means for managing automatic control of the apparatus as a function of work required.

8. An apparatus according to claim 4, wherein the auxiliary circuit includes an auxiliary reservoir for detergent and an auxiliary pump for injecting the detergent into the water in the auxiliary circuit so as to provide a cleaning circuit.

9. An apparatus according to claim 8, wherein the pump has an output which may be controlled by an electrical signal.

10. An apparatus according to claim 8, wherein the controlling means comprises a control unit having memory and programmable means for managing automatic control of the apparatus as a function of work required.

11. An apparatus according to claim 4, wherein the pump is of a type having an output which may be controlled by an electrical signal.

12. An apparatus according to claim 4, wherein the controlling means comprises a control unit having a memory and programmable means for automatically controlling the apparatus.

13. The apparatus of claim 4 further comprising flow measuring means disposed in the principal circuit downstream of the pump for measuring the output of the principal circuit.

14. The apparatus of claim 13, wherein the flow measuring means comprises a continuous volumetric flow meter.

15. The apparatus of claim 13, wherein the pressure monitoring means comprises first means for monitoring the pressure upstream of the pump, and second means for monitoring the pressure downstream of the pump.

16. The apparatus of claim 15, wherein the controlling means comprises a control unit responsive to the flow measuring means and to the first and second pressure monitoring means for producing control signals for controlling the pump and the electrically controlled valve.

* * * * *